(12) United States Patent
Ludick

(10) Patent No.: US 9,208,390 B2
(45) Date of Patent: Dec. 8, 2015

(54) INTRA-VEHICULAR MOBILE DEVICE MANAGEMENT

(71) Applicant: Wilfred Ludick, Rowlett, TX (US)

(72) Inventor: Wilfred Ludick, Rowlett, TX (US)

(*) Notice: Subject to any disclaimer, the term of this patent is extended or adjusted under 35 U.S.C. 154(b) by 151 days.

(21) Appl. No.: 14/072,167

(22) Filed: Nov. 5, 2013

(65) Prior Publication Data

US 2014/0134992 A1     May 15, 2014

Related U.S. Application Data

(60) Provisional application No. 61/725,200, filed on Nov. 12, 2012.

(51) Int. Cl.
| | |
|---|---|
| *H04M 3/00* | (2006.01) |
| *G06K 9/00* | (2006.01) |
| *H04M 1/725* | (2006.01) |
| *H04W 4/02* | (2009.01) |
| *H04W 48/02* | (2009.01) |
| *H04W 64/00* | (2009.01) |

(52) U.S. Cl.
CPC ....... *G06K 9/00832* (2013.01); *H04M 1/72569* (2013.01); *H04M 1/72577* (2013.01); *H04W 4/028* (2013.01); *H04W 4/027* (2013.01); *H04W 48/02* (2013.01); *H04W 64/006* (2013.01)

(58) Field of Classification Search
CPC ............... H04M 1/72577; H04M 2250/12; H04M 1/67; H04M 1/6091; H04M 1/72572; H04M 1/72569; H04M 1/72552; H04M 1/6075; H04M 15/62; H04M 1/677; H04W 48/04; H04W 4/027; H04W 4/046; H04W 48/02; H04W 4/02; H04W 4/008; H04W 64/00; H04W 4/025; H04W 4/043
USPC .......... 455/418, 26.1, 569.2, 414.1, 466, 419, 455/423, 552.1, 575.9, 417; 381/86; 340/426.2, 670, 988, 995.13; 342/450
See application file for complete search history.

(56) References Cited

U.S. PATENT DOCUMENTS

| | | | |
|---|---|---|---|
| 2008/0201783 A1* | 8/2008 | Tamai | 726/28 |
| 2011/0105082 A1 | 5/2011 | Haley | |
| 2011/0137508 A1 | 6/2011 | Manchado | |
| 2011/0183601 A1 | 7/2011 | Hannon | |
| 2011/0244825 A1 | 10/2011 | Ewell, Jr. | |
| 2011/0282908 A1 | 11/2011 | Fly et al. | |
| 2011/0298829 A1 | 12/2011 | Stafford et al. | |
| 2012/0040665 A1 | 2/2012 | Liu et al. | |
| 2012/0115413 A1 | 5/2012 | Czaja et al. | |
| 2012/0212508 A1* | 8/2012 | Kimball | 345/633 |
| 2012/0214463 A1* | 8/2012 | Smith et al. | 455/418 |
| 2012/0214469 A1 | 8/2012 | Tadayon et al. | |
| 2012/0268235 A1 | 10/2012 | Farhan et al. | |
| 2012/0289214 A1 | 11/2012 | Hynes et al. | |
| 2012/0289217 A1 | 11/2012 | Riemer et al. | |

OTHER PUBLICATIONS

International Search Report for PCT/US2013/068637, Dec. 17, 2013, pp. 1-8, International Searching Authority/KR.

* cited by examiner

*Primary Examiner* — Fred Casca
(74) *Attorney, Agent, or Firm* — Grady K. Bergen; Griggs Bergen LLP; Stephen Liu

(57) ABSTRACT

The illustrative embodiments described herein provide a computer-implemented method, apparatus, and computer program product for managing mobile device usage in a moving vehicle. In response to detecting that a user is traveling at a speed consistent with vehicular travel, optical data from an interior of the moving vehicle is detected. The optical data is analyzed to identify a set of vehicular markers. The user's intra-vehicular location is determined in relation to the set of vehicular markers. If the user's intra-vehicular location is the driver's seat, then restricted use protocols are initiated.

38 Claims, 5 Drawing Sheets

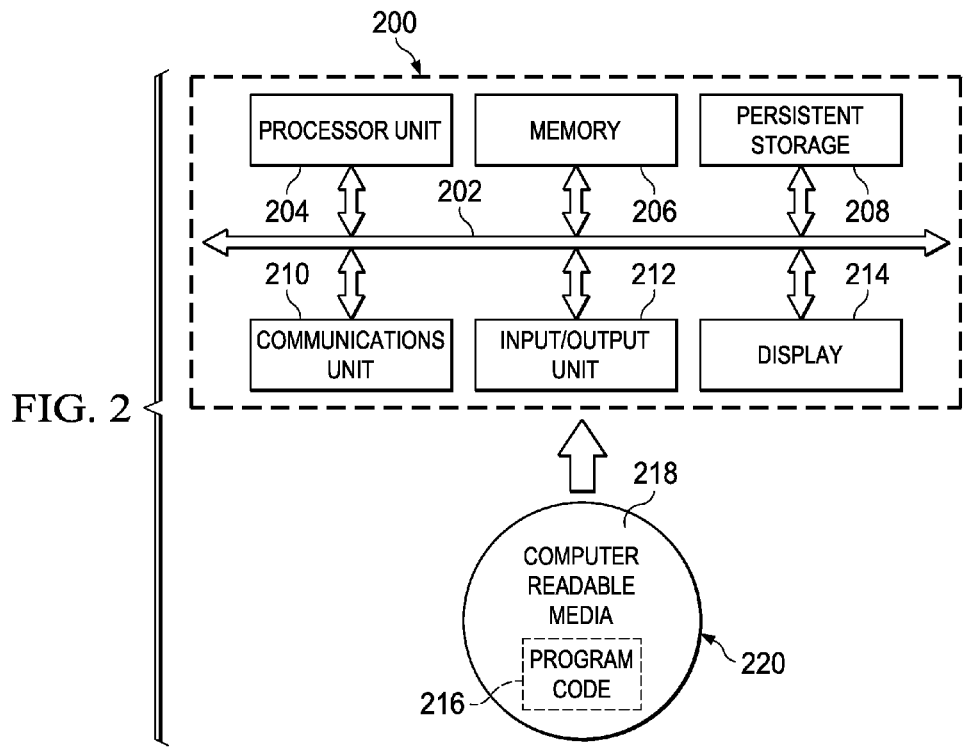
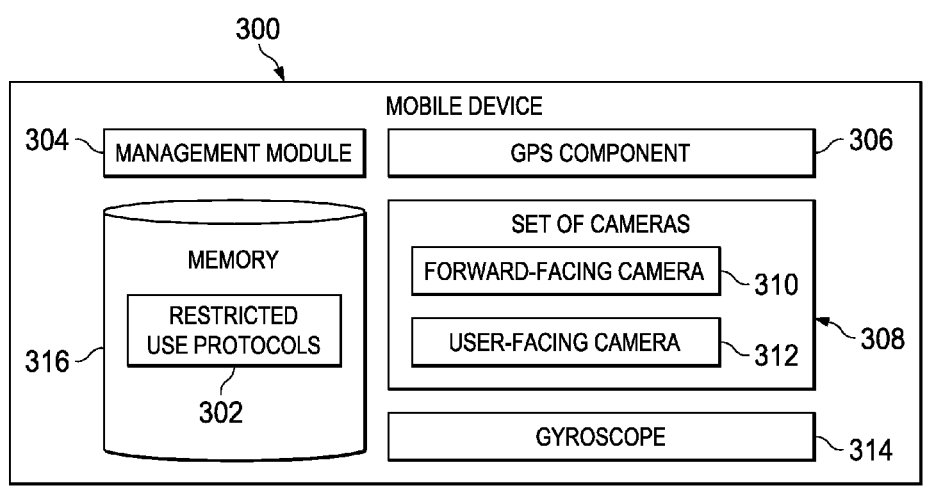
FIG. 2
FIG. 3

INTRA-VEHICULAR MOBILE DEVICE MANAGEMENT

CROSS-REFERENCE TO RELATED APPLICATIONS

This application claims the benefit of U.S. Provisional Application No. 61/725,200, filed Nov. 12, 2012, which is incorporated herein by reference in its entirety for all purposes.

BACKGROUND OF THE INVENTION

1. Field of the Invention

The present invention relates generally to managing the operation of mobile devices. Still more particularly, the present invention relates to modifying mobile device usage during vehicular operation.

2. Description of the Related Art

Mobile devices, in essence, are portable computing devices that provide users with instantaneous access to information, entertainment, and means of communication. Examples of mobile devices include, but are not limited to, smartphones, tablets, and laptops. As mobile devices continue to evolve technologically, cost barriers fall and, as a result, the popularity and availability of mobile devices has increased exponentially. Conservative estimates indicate that the number of mobile device in America now exceeds the country's entire population.

Technophiles are increasingly integrating mobile device usage into their daily lives. However, many users lack the common sense and discipline to refrain from using their mobile devices in dangerous situations. Laws have been enacted as a means to enforce safe use of mobile devices, but infractions are often unnoticed and therefore rarely enforced.

SUMMARY OF THE INVENTION

The illustrative embodiments described herein provide a computer-implemented method, apparatus, and computer program product for managing mobile device usage in a moving vehicle. In response to detecting that a user is traveling at speeds consistent with vehicular travel, a set of images or optical data is captured or detected from an interior of the moving vehicle. The set of images or optical data is analyzed to identify a set of vehicular markers. The user's intra-vehicular location is determined in relation to the set of vehicular markers. If the user's intra-vehicular location is the driver's seat, then restricted use protocols are initiated.

BRIEF DESCRIPTION OF THE DRAWINGS

FIG. 2 is a block diagram of a data processing system in which illustrative embodiments may be implemented;

FIG. 3 is a block diagram of mobile device in which illustrative embodiments may be implemented;

DETAILED DESCRIPTION OF THE PREFERRED EMBODIMENT

Figure 1:
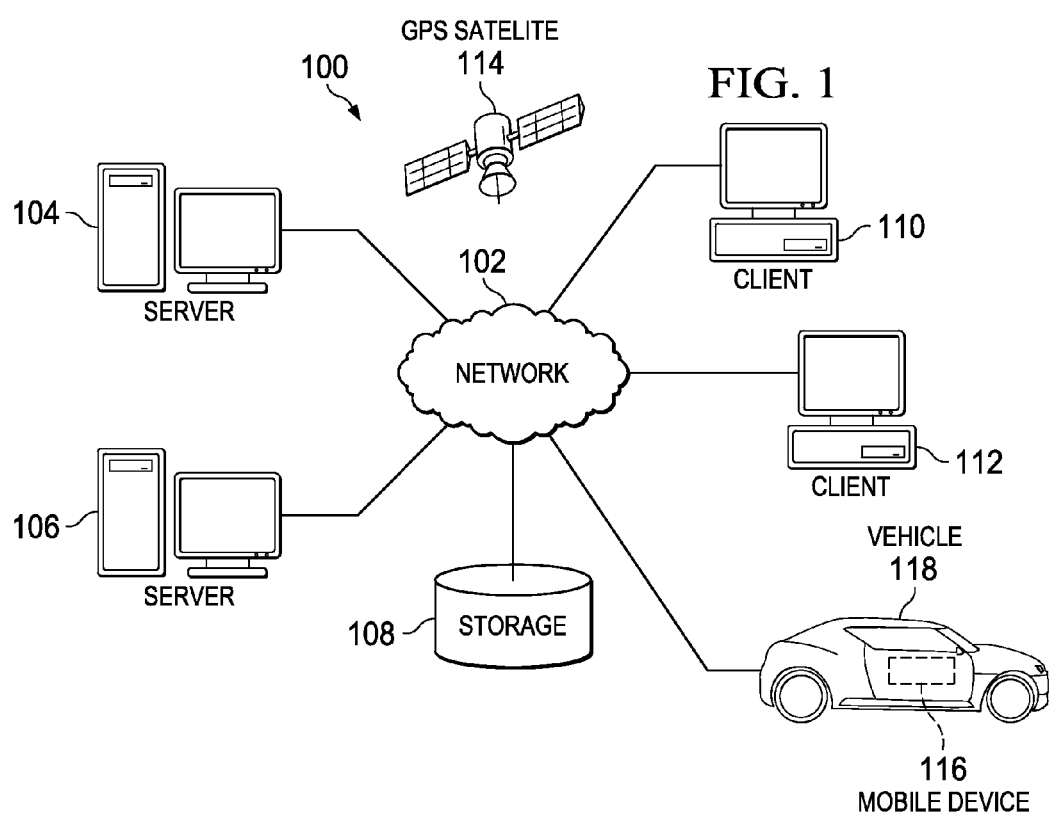
FIG. 1 is a pictorial representation of network data processing system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 connect to network 102. Clients 110 and 112 may be, for example, personal computers or network computers. In the depicted example, server 104 provides data, such as boot files, operating system images, and applications to clients 110 and 112. Clients 110 and 112 are clients to server 104 in this example. Network data processing system 100 may include additional servers, clients, and other devices not shown.

Network data processing system 100 also includes GPS satellite 114. GPS satellite 114 is one or more satellites integrated into the global positioning system that enables mobile devices, such as mobile device 116 to provide geo-location services. In this illustrative example in FIG. 1, mobile device 116 is a mobile phone in the possession of a user traveling in vehicle 118. Using GPS satellite 114, mobile device 116 is capable of determining that the user is traveling at speeds consistent with vehicular movement. Mobile device 116 may determine whether the user is located in the driver's seat of vehicle 118 and thus the presumed driver. In the event that mobile device 116 determines that the user is attempting to operate mobile device 116 while concurrently operating vehicle 118, restricted use protocols are initiated. The restricted use protocols can take any form that limits or modifies the usability of mobile device 116. For example, restricted use protocols may prevent any use of mobile device 116 or prevent the use of certain features such as texting and gameplay. However, if the user is not located in the driver's seat, then mobile device 116 may determine that the user is simply a passenger and mobile device usage is unrestricted.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 includes the Internet with network 102 including a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The proliferation of mobile devices has been made possible, in part, by rapidly advancing technology and the elimination cost barriers. Naturally, mobile device usage has increased as well. In attempt to curb the irresponsible use of mobile devices, certain restrictions have been imposed to augment and sometimes enforce the rules of etiquette and common sense. For example, common sense dictates that attempted operation of mobile devices is unadvisable because distracted drivers pose a risk to themselves, their passengers, and others on the road. Legislative restrictions have also been imposed to restrict the use mobile devices by drivers. However, the laws are inconsistent and vary across different jurisdictions. Consequently, an object of the present invention is to provide additional technological safeguards for insuring responsible operation of mobile devices.

The technological safeguard disclosed herein utilizes, in part, existing GPS technology that enables a mobile device to calculate a user's rate of travel. Such features are commonly utilized in mapping and navigational applications. The user's rate of speed can be used to determine whether a mobile device user is in a moving vehicle if the rate of travel exceeds a threshold rate of human, bipedal movement. Because a universal moratorium on mobile device usage in moving vehicles is unrealistic and undesirable, restrictions should be directed only towards drivers of the moving vehicle. As such, a solution is required which enables a mobile device to determine the user's intra-vehicular location as a determinant for restricting mobile device usage. An individual who is sitting in the driver's seat of a moving vehicle can be presumed to be driving that vehicle; thus restriction of mobile device usage predicated on the user's intra-vehicular location can be achieved.

Accordingly, one embodiment provides for a computer-implemented method, apparatus, and computer program product for managing mobile device usage in a moving vehicle. In response to detecting that a user is traveling at speeds consistent with vehicular travel, a set of images or optical data is captured or detected from an interior of the moving vehicle. The set of images or optical data is analyzed to identify a set of vehicular markers. The user's intra-vehicular location is determined in relation to the set of vehicular markers. If the user's intra-vehicular location is the driver's seat, then restricted use protocols are initiated.

FIG. 3 is a block diagram of a mobile device in which illustrative embodiments may be implemented. In particular, mobile device 300 is a computing device, such as mobile device 116 in FIG. 1. Further, in this illustrative example in FIG. 3, mobile device 300 is a smartphone. In other embodiments, mobile device 300 may be a laptop, a tablet computer, or any other computing device having analogous components capable of providing similar functionality.

The operation of mobile device 300 may be restricted or otherwise managed to prevent its use in unsafe situations. A situation may be deemed unsafe if the user's attention is otherwise divided between operating mobile device 300 and performing another action that could result in catastrophic consequences, such as driving a vehicle. Restrictions on the operation of mobile device 300 may be set forth in restricted use protocols 302. Restricted use protocols 302 are rules that govern the operation of mobile device 300. The rules identify situations where use of mobile device 300 are modified or otherwise restricted. Restricted use protocols 302 may specify an outright restriction on the use and operation of mobile device 300, or simply prevent a user from accessing certain features of applications. For example, restricted use protocols 302 may prevent a driver from texting or playing games but allow the driver to place emergency phone calls. These rules may be established by state or federal law or by a cell phone service provider. Additionally, restricted use protocols 302 may be created by users or third parties, such as parents or caretakers of underage users.

One object of the present invention is managing the use of mobile device 300 by drivers. To that end, restricted use protocols 302 may include more granular settings so that use of mobile device 300 may be restricted once a specific speed is achieved and maintained for a pre-determined amount of time. Thus, restricted use protocols 302 may prevent a driver from operating mobile device 300 at highway speeds where accidents may be more catastrophic, and allow the operation of mobile device 300 when a user is stopped at a stoplight.

In another similar example, use mobile device 300 may be restricted when the user is traveling at speeds indicative of travel through a school zone. For example, urban and suburban school speed zones limit a driver's speed to twenty miles per hour. This school zone speed limit may be set forth in restricted use protocols 302. Restricted use protocols 302 may be triggered once the specified school zone speed has been attained for a predetermined period of time, as travel through a school speed zone is presumed. In certain embodiments, restricted use protocols 302 may be implemented upon the GPS component correlating the location of mobile device 300 to be within a certain selected geographic area. This may be alone or in combination with a monitored speed of mobile device 300. The selected areas may be a school zone or other areas where restricted use may be desired. Map data that can be correlated with GPS coordinates stored in local memory or stored remotely and accessed through network 102.

Restricted use protocols 302 may also specify default actions to be taken in the event that a user's intra-vehicular location cannot be determined. In this scenario, restricted use protocols 302 may impose restrictions as though the user were assumed to be driving the vehicle. Alternatively, restricted use protocols 302 may specify a simple task to complete in an attempt to determine whether the user is a driver. For example, the task may be requesting a simple response to a prompt, such as a simple trivia question or math test that is presented to a user on mobile device 300. The prompt may be presented to the user for a short period of time and easily overlooked by a user who is also driving a vehicle but noticeable to a passenger not otherwise distracted. Responses that are wrong or returned outside of an accepted time frame would impose restrictions on the use of mobile device 300.

Management module 304 controls the use of mobile device 300 in view of restricted use protocols 302. In this illustrative example in FIG. 3, management module 304 is a software component of mobile device 300. However, in alternate embodiments, management module 304 may be a combination of software and hardware. In either event, management module 304 controls the user of mobile device 300 with reference to data received from other components of mobile device 300, such as GPS component 306. GPS component 306 is a receiver capable of determining the location of mobile device 300 by referencing a global positioning satellite, such as GPS satellite 114 in FIG. 1.

By determining a change of location of mobile device 300 over a predetermined period of time, GPS component 306 can calculate a rate of travel by mobile device 300. Management module 304 receives this data and determines whether mobile device 300 is moving at a rate consistent with vehicular travel. For example, if GPS component 306 provides data that indicates mobile device 300 is traveling at a speed greater than ordinary, bipedal movement, then management module 304 may assume that mobile device 300 is in the possession of a user riding in a vehicle. The threshold traveling speed that triggers restriction by management module 304 is set forth in restricted use protocols 302.

In other embodiments, a user's rate of travel may be determined by any other currently existing or later developed means. For example, multilateration of radio signals emanating from a set of cell towers may be sufficient to establish that a user is traveling in a vehicle. Further, mobile device 300 may acquire speed data directly from a vehicle in which the user is traveling. In this embodiment, a user's speed data may be provided by the vehicle's systems and transmitted to mobile device 300 via a suitable communications link, such as Bluetooth®. This solution may be optionally implemented in the event that communications between mobile device 300 and the GPS system and/or a set of cell towers is interrupted or otherwise unavailable.

Once management module 304 detects that a threshold traveling speed has been achieved, steps are taken to determine the user's intra-vehicular location. If management module 304 determines that the user is in the driver's seat of the vehicle, the user is presumed to be driving the vehicle. In an illustrative embodiment, management module 304 identifies the user's intra-vehicular location by analyzing a set of images or optical data of the vehicle interior, which is captured or detected by set of cameras or optical devices 308.

As used herein, the expression "optical devices" is intended to encompass cameras, as well as other non-camera optical devices. Additionally, where the expression "camera" or similar expressions are used in the description, it is intended to be understood that other non-camera optical devices could also be used instead of or in combination with an optical devices that constitutes a camera or cameras. Such non-camera optical devices are those devices that do not necessarily function as a camera for capturing images but are otherwise capable of detecting or sensing optical data. For ease of description, however, the expression "camera" or similar expressions have been used throughout this description, as cameras are particularly useful in the present invention. Therefore, where the use of the expression "camera" appears in the detailed description it should be read and understood that non-camera optical devices could be used instead or in combination, unless expressly stated otherwise or is otherwise apparent from the context.

Likewise, it should be understood that the expression "optical data" and similar expressions is meant to encompass images as well as non-image optical data. Where the expression "image" or similar expressions are used in the detailed description, it should be read and understood that non-image optical data could also be used instead or in combination, unless expressly stated otherwise or is otherwise apparent from the context. The optical data or images include those that are produced from visible and non-visible light. This includes visible light, ultraviolet light, and infrared light. Combinations of different visible and non-visible light may be used as the optical data. In certain instances, the optical device or camera may be a thermographic device that is capable of capturing or detecting thermal optical data or images.

Set of cameras or optical devices 308 is one or more cameras or optical devices capable of capturing individual pictures or a series of pictures viewable as video or sensing or detecting optical data. In a particular example in FIG. 3, set of cameras 308 includes forward-facing camera 310 and user-facing camera 312. Forward-facing camera 310 is a camera found on the surface of mobile device 300 opposite the touchscreen and capable of capturing images in the line of sight of the user. User-facing camera 312 is the camera found on the same surface as the touchscreen and usable for capturing images of the user.

In some embodiments, the cameras or optical devices 308 may be those devices or sensors that do not necessarily function as a camera for capturing images but rather detect or sense non-image optical data. The optical devices may be in the form of devices or sensors that detect, sense, or capture light gradients, contrasting or variations in light or light intensities. This may include visible light, UV light, infrared light, or combinations of these. By way of example, this may include a contrast or variation detected in the light emanating from a person and the person's surroundings. Non-camera optical devices may be used alone or in combination with a camera or camera.

In an illustrative embodiment, management module 304 instructs set of cameras 308 to capture a set of images that includes at least one image from forward-facing camera 310 and at least one image from user-facing camera 312. Management module 304 analyzes the set of images or optical data to determine the user's intra-vehicular location. In particular, management module 304 analyses the set of images or optical data to identify one or more vehicular markers that can be used to determine a location from which the set of images were captured. Vehicular markers are features located in the interior of a vehicle, and which are easily recognizable and generally found in universal locations regardless of the vehicle make or model. Examples of vehicular markers include a steering wheel, a center console, a stick shift, an overhead dome light, speedometer, fuel gauge, and the like.

The set of images or optical data may be analyzed using any currently available or later developed means. For example, advances in computer vision have enabled the creation of autonomous driving vehicles, sophisticated object recognition systems implemented in a variety of industries including manufacturing and security. The image processing software for analyzing the set of images captured by set of cameras 308 may be integrated into management module 304. In an alternate embodiment, the image processing software may be hosted remotely from mobile device 300, such as on server 104 in FIG. 1. In this alternate embodiment the set of images are transmitted via a network, such as network 102 in FIG. 1, and analyzed remotely. Analysis results may be returned to management module 304 for further action.

The image processing software for analyzing the set of images or optical data may also be facilitated or enhanced through the use of image templates for the particular vehicle, such as make and model, with which the mobile device is being used. These image templates may be provided by automobile manufacturers or other parties with the image templates being tailored to the particular vehicle. These may even be specific to a particular vehicle, based on a VIN or other vehicle identifying information, for which manufacturing information is available or vehicular marker information is known. Thus, based upon the particular vehicle identifying information provided to the mobile device 300 the image template may be provided with or without certain vehicular markers, (e.g., existence or non-existence sunroof, shape or configuration of headrest, consol configuration, window frame configuration, etc.) based upon the vehicle identified. The vehicle's systems may also be provided with this image template information and this information can be transmitted to the mobile device 300 via a suitable communications link, such as Bluetooth®, so that when the mobile device user is using a particular vehicle, the vehicle's own system provides the appropriate image template for that particular vehicle to facilitate the determination of the user's intra-vehicular location.

To assist in a determination of a user's intra-vehicular location, management module 304 may store an orientation descriptor with each image in the set of images. The orientation descriptor is data that describes the physical orientation of mobile device 300 as the set of images are captured. The orientation descriptor would indicate whether mobile device 300 is tilted and to what degree. This data may facilitate a determination of a user's intra-vehicular location in ambiguous cases. For example, a set of images taken with a forward-facing camera that depicts a center console could have been taken from either the passenger seat or the driver's seat. However, if the front touchscreen of mobile device 300 were tilted toward the driver's seat, then management module 304 could determine that the image was captured from the driver's seat rather than the passenger seat.

The orientation descriptor is provided by gyroscope 314. Gyroscope 314 is a device for measuring an orientation of mobile device 300. Gyroscope 314 may be any type of orientation-measuring device, including but not limited to accelerometers commonly found in mobile devices.

Although the illustrative example in FIG. 3 discusses restricting operation of mobile device 300 if the user is the driver of a vehicle, management module 304 can also restrict the operation of mobile device 300 in the event that the user is operating another mode of transportation. Thus, management module 304 may restrict the use of mobile device 300 in the event that the user is also driving a boat, plane, train, or other form of transportation.

As depicted in FIG. 3, restricted use protocols 302 are stored in memory 316. Memory 316 may take any form, including but not limited to memory 206 in FIG. 2. Furthermore, in an alternate embodiment, restricted use protocols 302 may be stored remotely from mobile device 300. For example, restricted use protocols 302 may be stored in a network-accessed storage, such as storage 108 in FIG. 1.

Figure 4:
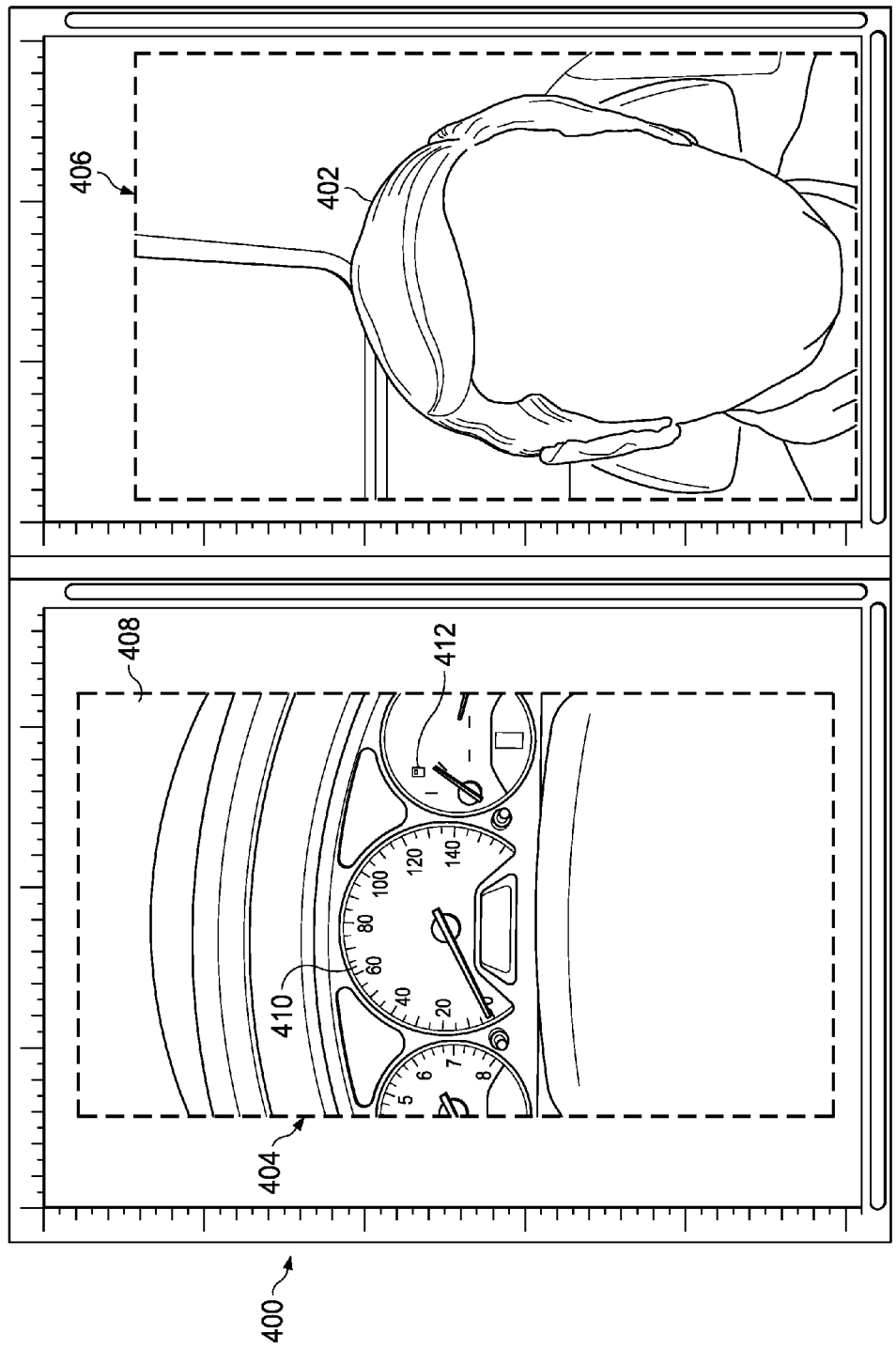
FIG. 4 is a set of images that may be used to determine a user's intra-vehicular location in accordance with an illustrative embodiment.

FIG. 4 is a set of images for determining a user's intra-vehicular location in accordance with an illustrative embodiment. Set of images 400 is one or more images captured by set of cameras 308 at the request of management module 304. In one embodiment, set of images 400 are captured in response to a determination that user 402 is traveling at speeds consistent with vehicular travel.

Set of images 400 includes forward-facing image 404 and user-facing image 406. Forward-facing image 404 is an image captured by a forward-facing camera such as forward-facing camera 310. Similarly, user-facing image 406 is an image captured by a user-facing camera such as user-facing camera 312. In an illustrative embodiment, the images in set of images 400 are captured substantially concurrently to allow management module 304 to analyze images on either side of mobile device 300.

Management module 304 analyzes set of images 400 to identify a set of vehicular markers for determining an intra-vehicular location of user 402. In particular, the user's location can be determined with reference to the set of vehicular markers captured in set of images 400 as it relates to user 402 to determine an intra-vehicular location of user 402. Thus, if the set of vehicular markers captured in forward-facing image 400 are consistent with vehicular controls used by a driver to operate a vehicle, then management module 304 may determine that user 402 was present in the driver's seat of the vehicle when forward-facing image 404 was taken. In further support of this determination, management module 304 may reference user-facing image 406 to confirm that user 402 is in fact seated and facing the set of vehicular markers used by a driver of a vehicle.

Analysis of the set of vehicular markers may further determine whether user 402 is seated and facing the set of vehicular markers. For example, an analysis on a portion the arced shape of steering wheel can be used to determine whether the user is seated directly in front of the steering wheel or in the passenger seat. An image of the steering wheel from the driver's seat will show a substantially circular shape whereas an image of the steering wheel from the passenger's seat will show a shape more consistent with an oval.

In this illustrative example in FIG. 4, management module 304 analyzes forward-facing image 404 and identifies the following set of vehicular markers: steering wheel 408, speedometer 410, and fuel gauge 412 Likewise, management module 304 analyzes user-facing image 406 and identifies user 402. Because set of images 400 was taken substantially concurrently, management module can determine that, at the time set of images 400 was taken, user 400 was facing steering wheel 408, speedometer 410, and fuel gauge 412. The location of set of vehicular markers in set of images 400 in relation to user 402 enables management module 304 to identify an intra-vehicular location of user 402. Specifically, the intra-vehicular location of user 402 is the driver's seat. Thereafter, management module 304 would reference restricted use protocols 302 to determine the manner in which use of mobile device 300 should be restricted.

Alternatively, if a forward-facing image 404 showed a glove compartment or the back of a seat, then management module 304 would determine that the user of the mobile device would not be located in the driver's seat of the moving vehicle and thus permit the user to have unfettered access to the features of the mobile device. Further, if management module 304 is incapable of analyzing the set of images captured by set of cameras 308, such as in the situation where the images are taken in low light situations, then management module 304 can implement a default protocol specified in restricted use protocols 302 as previously disclosed.

Although set of images 400 includes only two images, in another embodiment, set of images 400 may include more than two images. For example, set of images 400 may be a sequence of images that form a video. Set of images 400 may also be a series of images captured at set intervals. Additional images would provide management module 304 with additional data by which to make a determination of a user's intra-vehicular location.

Figure 5:
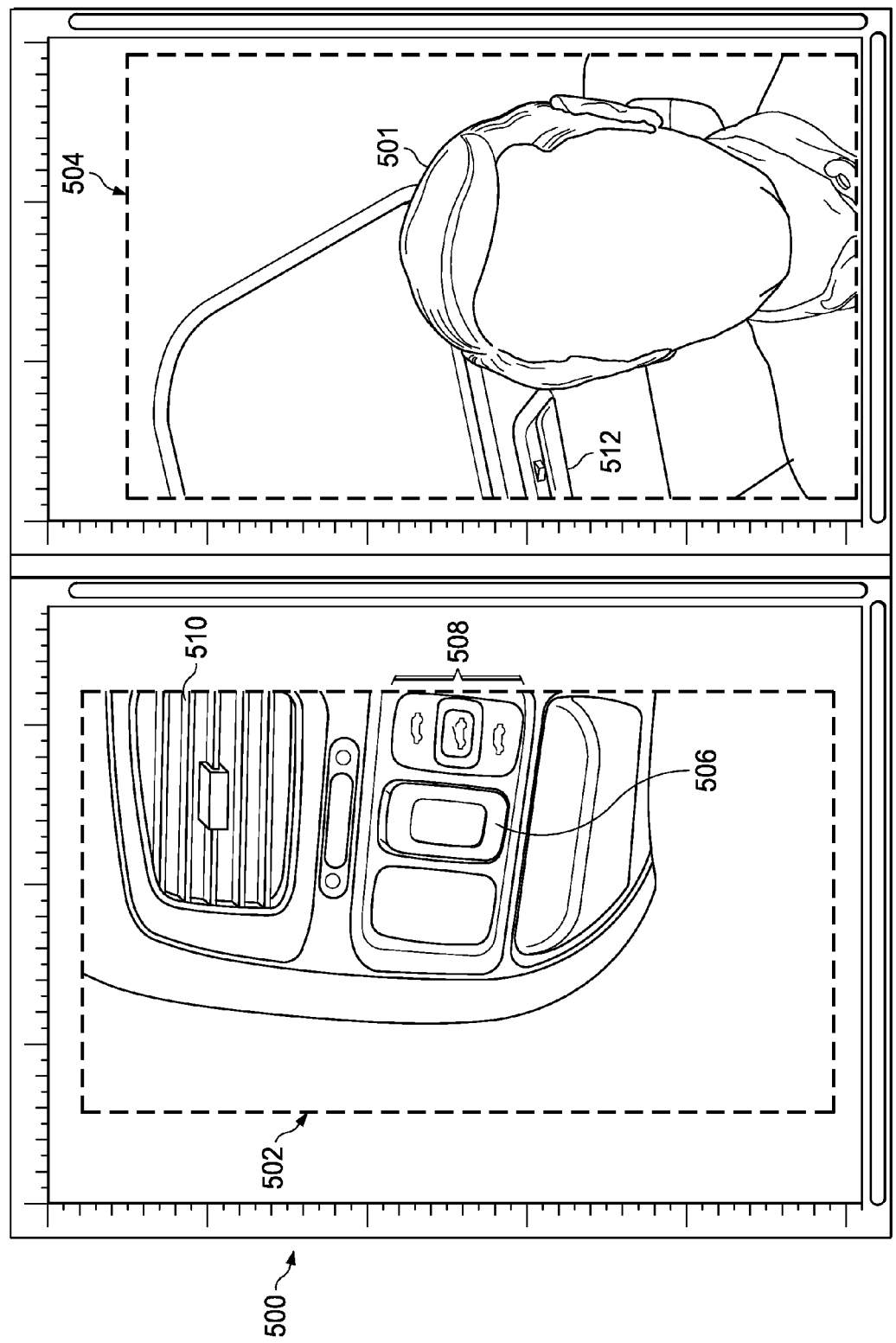
FIG. 5 is another set of images that may be used to determine a user's intra-vehicular location in accordance with an illustrative embodiment.

FIG. 5 is another set of images for determining a user's intra-vehicular location in accordance with an illustrative embodiment. Set of images 500 may be used by management module 304 to identify an intra-vehicular location of user 501 by comparing the relative position of user 501 with the set of vehicular markers depicted in set of images 500.

Set of images 500 is captured by a set of cameras or optical devices, such as set of cameras 308 in FIG. 3. Set of images 500 includes forward-facing image 502 and user-facing image 504. Forward-facing image 502 is an image captured by a forward-facing camera and user-facing image 504 is an image captured by a user-facing camera. In an illustrative embodiment, the images in set of images 500 are captured substantially concurrently to allow management module 304 to analyze images on either side of mobile device 300.

Management module 304 may analyze set of images 500 to determine an intra-vehicular location of user 501 using a set of vehicular markers as points of reference. For example, forward-facing image 502 may depict a set of vehicular markers commonly found in a location of a vehicle accessible to a driver. A sophisticated object recognition program is capable of identifying the type of controls or features depicted in the set of vehicular markers and determine a likely location from which forward-facing image 502 was captured either by comparison to a database of images of vehicle interiors, identifying a function of the controls by the icons and/or descriptors associated with the controls, or using any other currently existing or later developed method of object recognition. Management module 304 may also analyze user-facing image 504 and determine that a position of user 501 in relation to a vehicular marker in the image is sufficient to determine the user's intra-vehicular location.

In an illustrative example, forward-facing image 502 depicts a portion of a dashboard. Management module 304 may be able to determine that forward-facing image 502 depicts a set of vehicle markers that includes cruise control 506, sunroof controls 508, and air vent 510. Further, management module 304 may determine that the set of vehicle markers in forward-facing image 502 is found on the driver's side of a commonly available passenger vehicle. In a simplistic embodiment, management module 304 compares forward-facing image 502 with a database of images to identify the set of vehicular markers and the location from which the set of vehicular markers would be accessible in order to determine a location from which the image was captured.

Management module 304 may also analyze user-facing image 504 for identifying a location of user 501. Management module 304 determines an intra-vehicular location of user 501 in a moving vehicle by comparing the location of user 501 in relation to a vehicular marker identified in user-facing image 504. Overhead light 512 is a vehicular marker that is commonly found on the ceiling of most vehicles, located centrally. Because overhead light 512 is found over the right shoulder of user 501, management module 304 can determine that the user is located in the driver's side of a left hand driver vehicle.

Although the examples discussed herein relate specifically to left-hand driver vehicles commonly found within the United States and other countries that implement a right-hand traffic system, the same principles would apply for right-hand driver vehicles found traveling in left-hand traffic countries. Thus, if management module 304 determines that a user is in the United Kingdom, a left-hand traffic country, the location of a vehicular marker such as overhead light 512 in FIG. 5 would indicate that the user is located in a passenger vehicle of a moving vehicle. GPS data provided by GPS component 306 would be sufficient to identify a location of mobile device 300 and establish a vehicle configuration as either a right-hand driver vehicle or a left-hand driver vehicle.

Figure 6:
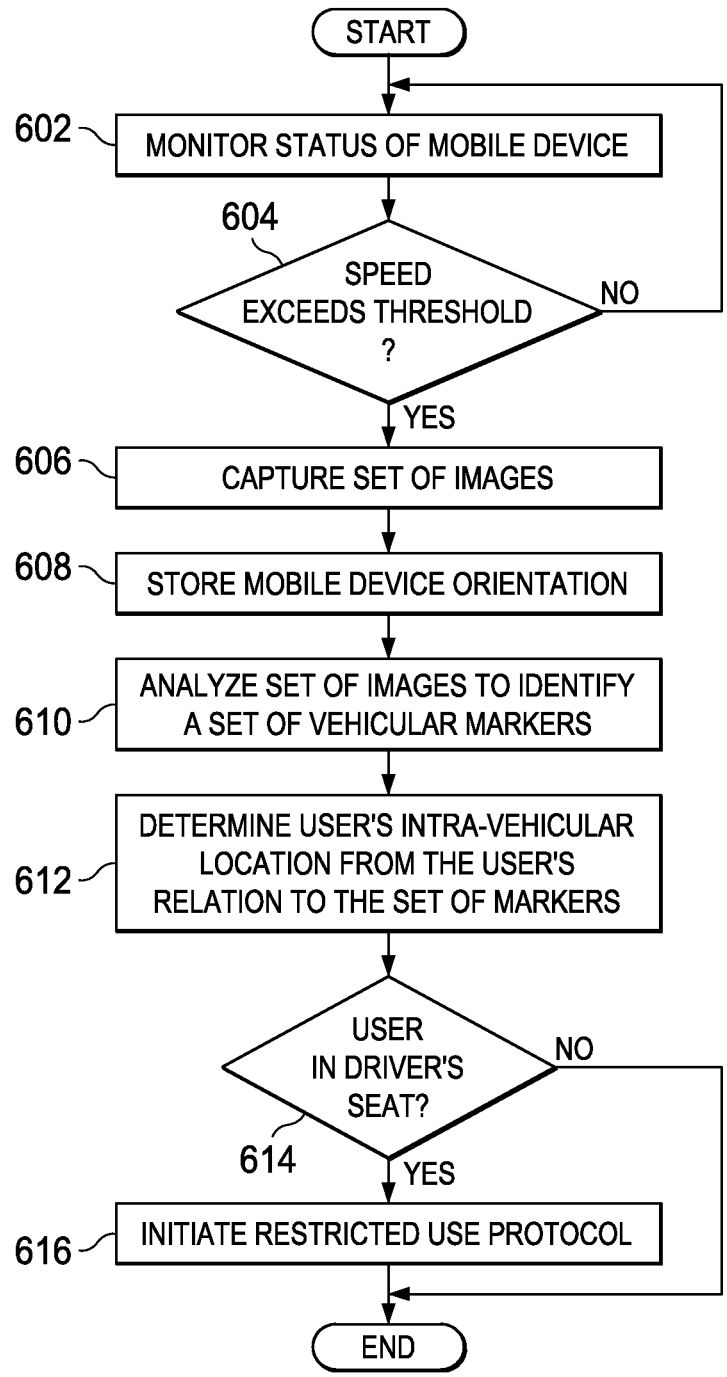
FIG. 6 is a flowchart of a process for managing operation of a mobile device in accordance with an illustrative embodiment.

FIG. 6 is a flowchart of a process for managing operation of a mobile device in accordance with an illustrative embodiment. The process depicted in FIG. 6 may be performed by management module 304 in FIG. 3.

The process begins by monitoring a status of the mobile device (step 602). The status of the mobile device includes the geographical location of the mobile device, as well as various travel metrics that include, but are not limited to the speed and acceleration of the mobile device.

The process makes a determination as to whether a speed is greater than a speed threshold (step 604). If the determination is made that the speed is not greater than the travel metric threshold, then the process returns to step 602 and a monitoring of the mobile device status continues. However, if the determination is made that a speed exceeds a speed threshold then a set of images is captured or optical data is detected (step 606). The set of images or optical data may be captured or detected by one or more onboard cameras or optical devices. In the event that the mobile device includes a forward-facing camera and a user-facing camera, then the two cameras would preferably take the images substantially simultaneously. Furthermore, each camera or optical device may take a series of images or detect optical data at predetermined intervals. In this manner, a movement or rotation of the camera or optical device may be documented, thereby providing additional images or optical data for analysis.

Although not required in a preferred embodiment, an orientation of the mobile device may be stored for each image or optical data that is captured or detected in the set of images or optical data (step 608). The association of orientation data with the image or optical data provides additional context to assist in the analysis of the set of images.

Once sufficient data has been captured or detected, the process analyzes the set of images or optical data to identify vehicular markers (step 610). Vehicular markers include components commonly found in vehicles. For example, in a car or truck, vehicular markers can include a center console, an overhead dome light, a steering wheel, a stick shift, a rearview minor, seatbelt, or a side window. The analysis of the set of images may be performed by any currently existing or later developed means of image recognition and/or analysis.

A determination is made that establishes the user's intra-vehicular location from the set of images and optionally, the orientation of the mobile device at the time the set of images was captured (step 612). For example, a user's intra-vehicular location may be determined by comparing a relative location of a user to a set of vehicular markers identified in the set of images. The determination can be made that establishes that the user is either in the driver's seat, the front passenger seat, or in one of the vehicle's rear seats.

The determination is then made as to whether the user is in the driver's seat (step 614). If the user is not located in the driver's seat and thus presumed to be a passenger of the vehicle, then the process terminates. However, if the determination is made that the user is located in the driver's seat, and thus driving the vehicle, then the process initiates a restricted use protocol (step 616) and terminates thereafter.

In accordance with the foregoing, the illustrative embodiments described herein provide a computer-implemented method, apparatus, and computer program product for managing mobile device usage in a moving vehicle. In response to detecting that a user is traveling at speeds consistent with vehicular travel, a set of images is captured from an interior of the moving vehicle. The set of images is analyzed to identify a set of vehicular markers. The user's intra-vehicular location is determined in relation to the set of vehicular markers. If the user's intra-vehicular location is the driver's seat, then restricted use protocols are initiated.

As is evident from the discussion presented herein, a notable benefit of implementing a technological barrier against unsafe mobile device usage is removing user discretion. Users are now absolved from knowing whether or not mobile device usage is against the law. Further, users no longer have the ability to unilaterally disregard the rule of law and common sense by operating a mobile device in pre-defined situations.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The software may be preinstalled on mobile device 116 or it may be downloaded or otherwise received by mobile device 116 through network 102 or other source.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing usage of a mobile device of a mobile device system, the mobile device having a forward-facing optical device and a reverse user-facing optical device, the method comprising:
    responsive to the mobile device system detecting the mobile device is traveling at a speed consistent with vehicular travel, detecting optical data from the forward-facing and reverse user-facing optical devices from an interior of a moving vehicle;
    analyzing the optical data with the mobile device system to identify a user and a set of vehicular markers, at least one of the identified vehicular markers being a vehicular marker from optical data detected from the reverse user-facing optical device;
    determining with the mobile device system an intra-vehicular location of the user of the mobile device in relation to the set of vehicular markers; and
    responsive to determining that the intra-vehicular location of the user is positioned within a driver's seat, the mobile device system initiating restricted use protocols for selectively modifying functionality of the mobile device; and wherein
    determining the intra-vehicular location of the user further comprises:
    identifying using forward-facing optical data a vehicular configuration of the moving vehicle; and
    determining, from the reverse user-facing optical data, the intra-vehicular location of the user from a relative position of the user and the set of vehicular markers with reference to the identified vehicular configuration.

2. The method of claim 1, wherein detecting the speed of the mobile device is consistent with vehicular travel further comprises:
    receiving, from a GPS component of the mobile device system, speed data that exceeds a speed threshold.

3. The method of claim 1, wherein the reverse user-facing optical data is detected substantially concurrently with the forward-facing optical data.

4. The method of claim 1, wherein determining the intra-vehicular location of the user further comprises:
    identifying, from forward-facing optical data, one or more markers in the set of vehicular markers are for operating the motor vehicle; and
    responsive to determining that the user is located directly in front of the one or more markers, determining the intra-vehicular location of the user is the driver's seat.

5. The method of claim 1, wherein initiating restricted use protocols further comprises at least one of restricting gameplay and restricting texting.

6. The method of claim 1, further comprising:
    detecting gyroscopic orientation data of the mobile device as optical data from the forward-facing and the reverse user-facing optical devices is detected and using said detected gyroscopic orientation data to facilitate determining the intra-vehicular location of the user of the mobile device in relation to the set of vehicular markers.

7. The method of claim 1, wherein:
    at least one of the forward-facing and the reverse user-facing optical devices is a thermographic device for detecting thermo optical data.

8. A computer program product for managing usage of a mobile device having a forward-facing optical device and a reverse user-facing optical device, the computer program product comprising:
    a non-transitory computer readable medium storing program instructions including the following:
    first program instructions for detecting optical data of the forward-facing optical device and reverse user-facing optical devices from an interior of a moving vehicle in response to detecting the mobile device is traveling at a speed consistent with vehicular travel;
    second program instructions for analyzing the detected optical data to identify a user and a set of vehicular markers, at least one of the identified vehicular markers being a vehicular marker from optical data detected from the reverse user-facing optical device;
    third program instructions for determining an intra-vehicular location of the user of the mobile device in relation to the set of vehicular markers; and
    fourth program instructions for initiating restricted use protocols for selectively modifying functionality of the mobile device in response to determining that the intra-vehicular location of the user is positioned within a driver's seat;

wherein the third program instructions further comprises:
fifth program instructions for identifying a vehicular configuration of the moving vehicle using forward-facing optical data; and
sixth program instructions for determining, from the reverse user-facing optical data, the intra-vehicular location of the user from a relative position of the user and the set of vehicular markers with reference to the vehicular configuration.

9. The computer program product of claim 8, wherein the first program instructions further comprises:
seventh program instructions for receiving, from a GPS component of the mobile device, speed data that exceeds a speed threshold.

10. The computer program product of claim 8, wherein the first program instructions wherein the reverse user-facing optical data is detected substantially concurrently with the forward-facing optical data.

11. The computer program product of claim 8, wherein the third program instructions further comprises:
eighth program instructions for identifying, from forward-facing optical data, one or more markers in the set of vehicular markers are for operating the motor vehicle; and
ninth program instructions for determining the intra-vehicular location of the user is the driver's seat in response to determining that the user is located directly in front of the one or more markers.

12. The computer program product of claim 8, wherein the fourth program instructions further comprises:
tenth program instructions for restricting at least one of gameplay and texting.

13. The computer program product of claim 8, further comprising:
eleventh program instructions stored on the non-transitory computer readable-type medium for detecting gyroscopic orientation data of the mobile device; and
twelfth program instructions stored on the non-transitory computer readable-type medium for analyzing the detected gyroscopic orientation data of the mobile device to determine the orientation of the mobile device when the optical data of the forward-facing optical device and reverse user-facing optical devices is detected; and wherein:
the third program instructions comprises instructions for determining an intra-vehicular location of the user of the mobile device in relation to the set of vehicular markers and the orientation of the mobile device.

14. The computer program product of claim 8, wherein:
the detected optical data is thermo optical data.

15. An apparatus for managing usage of a mobile device having a forward-facing optical device and a reverse user-facing optical device, the apparatus comprising:
a bus system;
a memory connected to the bus system, wherein the memory includes computer usable program code; and
a processing unit connected to the bus system, wherein the processing unit executes the computer usable program code to detect optical data from the forward-facing and reverse user-facing optical devices from an interior of a moving vehicle in response to detecting the mobile device is traveling at a speed consistent with vehicular travel; analyze the detected optical data to identify a user and a set of vehicular markers, at least one of the identified vehicular markers being a vehicular marker from optical data detected from the reverse user-facing optical device; determine an intra-vehicular location of a user in relation to the set of vehicular markers; and initiate restricted use protocols in response to determining that the intra-vehicular location of the user is positioned within a driver's seat, initiating restricted use protocols for selectively modifying functionality of the mobile device; and wherein
the processing unit further executes the computer usable program code to identify a vehicular configuration of the moving vehicle using forward-facing optical data; and determine, from the reverse user-facing optical data, the intra-vehicular location of the user from a relative position of the user and the set of vehicular markers with reference to the vehicular configuration.

16. The apparatus of claim 15, wherein the processing unit further executes the computer usable program code to receive, from a GPS component of the mobile device, speed data that exceeds a speed threshold.

17. The apparatus of claim 15, wherein the reverse user-facing optical data is detected substantially concurrently with the forward-facing optical data.

18. The apparatus of claim 15, wherein the processing unit further executes the computer usable program code to identify, from forward-facing optical data, one or more markers in the set of vehicular markers are for operating the motor vehicle; and determine the intra-vehicular location of the user is the driver's seat in response to determining that the user is located directly in front of the one or more markers.

19. The apparatus of claim 15, wherein:
the processing unit executes the computer usable program code to detect gyroscopic orientation data of the mobile device as optical data from the forward-facing and reverse user-facing optical devices is detected and wherein the detected orientation data of the mobile device is used to determine the intra-vehicular location of the user of the mobile device in relation to the set of vehicular markers.

20. The apparatus of claim 15, wherein:
at least one of the forward-facing optical device and the reverse user-facing optical device is a thermographic optical device and the processing unit executes computer usable program code to detect thermo optical data from the at least one of the forward-facing and reverse user-facing optical devices and analyzes the detected thermo optical data.

21. A method for managing usage of a mobile device of a mobile device system, the mobile device having a forward-facing optical device and reverse user-facing optical device, the method comprising:
responsive to the mobile device system detecting the mobile device is traveling at a speed consistent with vehicular travel, detecting optical data from the forward-facing and the reverse user-facing optical devices from an interior of a moving vehicle;
analyzing the optical data with the mobile device system to identify a user and a set of vehicular markers, at least one of the identified vehicular markers being a vehicular marker from optical data detected from the reverse user-facing optical device;
determining with the mobile device system an intra-vehicular location of the user of the mobile device in relation to the set of vehicular markers;
responsive to determining that the intra-vehicular location of the user is positioned within a driver's seat, the mobile device system initiating restricted use protocols for selectively modifying functionality of the mobile device; and further comprising detecting gyroscopic orientation data of the mobile device when optical data from the forward-facing and the reverse user-facing optical devices is detected and using said detected gyroscopic orientation data to facilitate determining the intra-vehicular location of the user of the mobile device in relation to the set of vehicular markers.

22. The method of claim 21, wherein detecting the speed of the mobile device is consistent with vehicular travel further comprises:

receiving, from a GPS component of the mobile device system, speed data that exceeds a speed threshold.

23. The method of claim 21, wherein the reverse user-facing optical data is detected substantially concurrently with the forward-facing optical data.

24. The method of claim 21, wherein determining the intra-vehicular location of the user further comprises:

identifying, from forward-facing optical data, one or more markers in the set of vehicular markers are for operating the motor vehicle; and responsive to determining that the user is located directly in front of the one or more markers, determining the intra-vehicular location of the user is the driver's seat.

25. The method of claim 21, wherein initiating restricted use protocols further comprises at least one of restricting gameplay and restricting texting.

26. The method of claim 21, wherein:

at least one of the forward-facing optical device and the reverse user-facing optical device is a thermographic optical device and the processing unit executes computer usable program code to detect thermo optical data from the at least one of the forward-facing and the reverse user-facing optical devices and analyzes the detected thermo optical data.

27. A computer program product for managing usage of a mobile device having a forward-facing optical device and a reverse user-facing optical device, the computer program product comprising:

a non-transitory computer readable medium storing program instructions including the following:

first program instructions for detecting optical data of the forward-facing optical device and reverse user-facing optical devices from an interior of a moving vehicle in response to detecting the mobile device is traveling at a speed consistent with vehicular travel;

second program instructions for analyzing the detected optical data to identify a user and a set of vehicular markers, at least one of the identified vehicular markers being a vehicular marker from optical data detected from the reverse user-facing optical device;

third program instructions for determining an intra-vehicular location of the user of the mobile device in relation to the set of vehicular markers;

fourth program instructions for initiating restricted use protocols for selectively modifying functionality of the mobile device in response to determining that the intra-vehicular location of the user is positioned within a driver's seat;

fifth program instructions for detecting gyroscopic orientation data of the mobile device; and sixth program instructions for analyzing the detected gyroscopic orientation data of the mobile device to determine the orientation of the mobile device when the optical data of the forward-facing optical device and reverse user-facing optical devices is detected; wherein:

the third program instructions comprises instructions for determining an intra-vehicular location of the user of the mobile device based on the set of vehicular markers and the gyroscopic orientation data of the mobile device.

28. The computer program product of claim 26, wherein the first program instructions further comprises:

seventh program instructions for receiving, from a GPS component of the mobile device, speed data that exceeds a speed threshold.

29. The computer program product of claim 26, wherein the first program instructions wherein the reverse user-facing optical data is detected substantially concurrently with the forward-facing optical data.

30. The computer program product of claim 26, wherein the third program instructions further comprises:

eighth program instructions for identifying, from forward-facing optical data, one or more markers in the set of vehicular markers are for operating the motor vehicle; and ninth program instructions for determining the intra-vehicular location of the user is the driver's seat in response to determining that the user is located directly in front of the one or more markers.

31. The computer program product of claim 26, wherein the third program instructions further comprises:

eighth program instructions for identifying a vehicular configuration of the moving vehicle using the forward-facing device; and ninth program instructions for determining, from the reverse user-facing optical data, the intra-vehicular location of the user from a relative position of the user and the set of vehicular markers with reference to the vehicular configuration.

32. The computer program product of claim 26, wherein the fourth program instructions further comprises:

tenth program instructions for restricting at least one of gameplay and texting.

33. The computer program product of claim 26, wherein: the detected optical data is thermo optical data.

34. An apparatus for managing usage of a mobile device having a forward-facing optical device and a reverse user-facing optical device, the apparatus comprising:

a bus system;

a memory connected to the bus system, wherein the memory includes computer usable program code; and a processing unit connected to the bus system, wherein the processing unit executes the computer usable program code to detect optical data from the forward-facing and reverse user-facing optical devices from an interior of a moving vehicle in response to detecting the mobile device is traveling at a speed consistent with vehicular travel; analyze the detected optical data to identify a user and a set of vehicular markers, at least one of the identified vehicular markers being a vehicular marker from optical data detected from the reverse user-facing optical device; determine an intra-vehicular location of a user in relation to the set of vehicular markers; and initiate restricted use protocols in response to determining that the intra-vehicular location of the user is positioned within a driver's seat, initiating restricted use protocols for selectively modifying functionality of the mobile device; and wherein the processing unit executes the computer usable program code to detect gyroscopic orientation data of the mobile device as optical data from the forward-facing and the reverse user-facing optical devices is detected and wherein the detected gyroscopic orientation data of the mobile device is used to determine the intra-vehicular location of the user of the mobile device in relation to the set of vehicular markers.

35. The apparatus of claim 33, wherein the processing unit further executes the computer usable program code to receive, from a GPS component of the mobile device, speed data that exceeds a speed threshold.

36. The apparatus of claim 33, wherein the reverse user-facing optical data is detected substantially concurrently with the forward-facing optical data.

37. The apparatus of claim 33, wherein the processing unit further executes the computer usable program code to identify, from forward-facing optical data, one or more markers in the set of vehicular markers are for operating the motor vehicle; and determine the intra-vehicular location of the user is the driver's seat in response to determining that the user is located directly in front of the one or more markers.

38. The apparatus of claim 33, wherein:
at least one of the forward-facing optical device and the reverse user-facing optical device is a thermographic optical device and the processing unit executes computer usable program code to detect thermo optical data from the at least one of the forward-facing and reverse user-facing optical devices and analyzes the detected thermo optical data.

* * * * *